Sept. 22, 1964    L. J. RAVER    3,150,309
ENGINE DRIVEN POWER SUPPLY SYSTEM
Filed July 28, 1961    2 Sheets-Sheet 1

INVENTOR.
Louis J. Raver
BY
C. R. Meland
HIS ATTORNEY

United States Patent Office 3,150,309
Patented Sept. 22, 1964

3,150,309
ENGINE DRIVEN POWER SUPPLY SYSTEM
Louis J. Raver, Anderson, Ind., assignor to General Motors Corporation, Detroit, Mich., a corporation of Delaware
Filed July 28, 1961, Ser. No. 127,557
3 Claims. (Cl. 322—90)

This invention relates to engine driven power supply systems and more particularly to a power supply system wherein an engine drives an alternating current generator having a pair of output windings and wherein means are provided for connecting said output windings in series or in parallel with the input terminals of a bridge rectifier network.

One of the objects of this invention is to provide an engine driven power supply system that is capable of supplying the electrical loads on a motor vehicle at engine idle and also at high speed operation of the engine.

Another object of this invention is to provide an engine driven power supply system wherein an alternating current generator having a pair of output windings is driven by the engine and wherein switching means are provided which connect the output winding in series or in parallel with the input terminals of a bridge rectifier network, the switching means being controlled as a function of a condition of operation of the engine. With this arrangement, the output windings of the alternating current generator are connected in series at engine idle and then are connected in parallel when the speed of the engine has increased to a predetermined speed.

Still another object of this invention is to provide an engine driven power system wherein an alternating current generator has a pair of output windings which may be connected selectively in series or in parallel with the input terminals of a bridge rectifier network but wherein the output voltage of the bridge rectifier network is maintained substantially constant regardless of whether the windings are connected in series or in parallel.

Still another object of this invention is to provide an engine driven power system wherein an alternating current generator has a pair of output windings providing in phase voltages and wherein the output windings are selectively connected in series or in parallel with the input terminals of a rectifier network, the output voltage of the rectifier network being maintained substantially constant by a voltage regulating means which includes a semiconductor switch means such as a transistor.

Further objects and advantages of the present invention will be apparent from the following description, reference being had to the accompanying drawings wherein preferred embodiments of the present invention are clearly shown.

Figure 1:
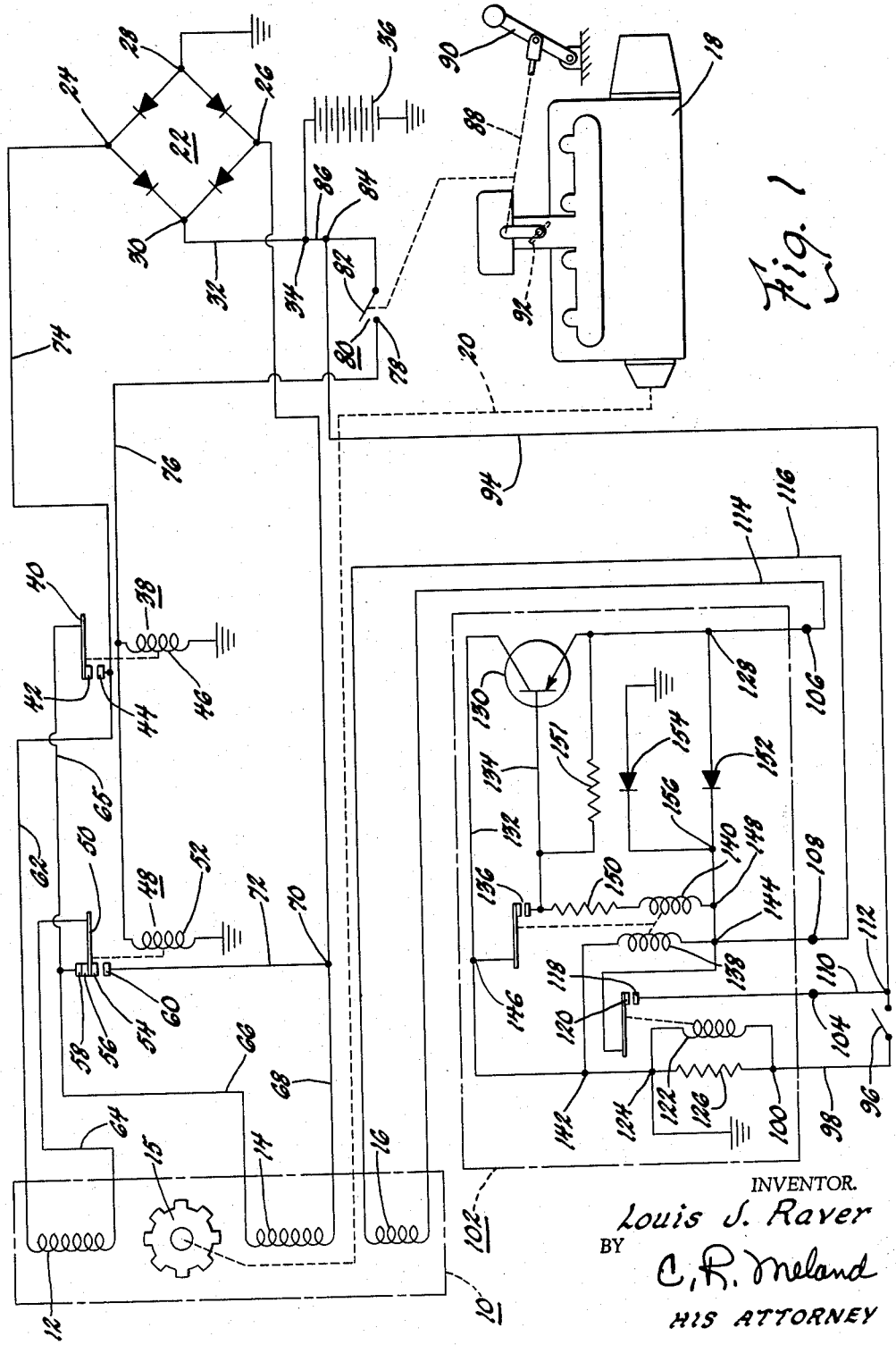
FIGURE 1 is a schematic circuit illustration of a power supply system made in accordance with this invention.

Referring now more particularly to FIGURE 1, the reference numeral 10 designates an alternating current generator. This alternating current generator may be of any conventional type and has a first output winding 12 and a second output winding 14. This generator has a rotor 15, a field winding 16 and the amount of voltage developed by the ouput windings 12 and 14 depends upon the amount of current flowing through the field winding 16. The generator 10 is arranged such that the output voltages of the output windings 12 and 14 are in phase with each other. This may be accomplished by winding the output windings 12 and 14 on common stator iron and winding them such that they have the same position relative to the magnetic poles so that the generated voltages in these windings will be in phase. The generator 10 could be of a type shown in application Serial No. 60,825, assigned to the assignee of this invention, and filed on October 6, 1960, with the exception that two output windings must be provided which are so positioned on the stator as to have output voltages which are in phase. The rotor 15 of the generator 10 is driven by an engine 18 through suitable torque transmitting means 20.

The power system of this invention includes a single phase full-wave bridge rectifier network generally designated by reference numeral 22. The bridge rectifier network 22 has A.C. input terminals 24 and 26 and has D.C. output terminals 28 and 30. One of the D.C. output terminals 28 is connected directly to ground whereas the other output terminal 30 is connected with the lead wire 32. The lead wire 32 is connected with a junction 34 and a storage battery 36 is connected between junction 34 and ground. Other electrical loads may be connected between the junction 34 and ground to be supplied from the output terminals 28 and 30 of the bridge rectifier 22.

The output windings 12 and 14 of the alternating current generator 10 can be connected either in series or in parallel with the input terminals 24 and 26 of the bridge rectifier network. To this end, a first relay 38 is provided including a shiftable armature 40 carrying a contact 42. The contact 42 cooperates with a fixed contact 44 and the armature 40 is shifted whenever the coil winding 46 of the relay 38 is energized.

Another relay generally designated by reference numeral 48 is provided and this relay includes a shiftable armature 50 which is shifted whenever the coil winding 52 of the relay is energized. The armature 50 carries contacts 54 and 56 which cooperate with the fixed contacts 60 and 58. When the relay coil 52 is not energized, the contacts 56 and 58 are in engagement but when the relay coil 52 is energized, the armature 50 is shifted downwardly to disengage contacts 56 and 58 and cause an engagement between contacts 54 and 60.

Although the relays 38 and 48 have been shown as separate and distinct relays, they could be mounted on the same metal supporting base as is well known to those skilled in the art.

The output winding 12 of the alternating current generator 10 is connected with lead wires 62 and 64. The lead wire 62 is connected with fixed contact 44 of relay 38 whereas the lead wire 64 is connected with the armature 50 of relay 48.

The output winding 14 is connected with lead wires 66 and 68. It is seen that lead wire 66 is connected with fixed contact 58 whereas lead wire 68 is connected with junction 70 and is also connected with the A.C. input terminal 26 of bridge rectifier 22. A lead wire 72 connects junction 70 and the fixed contact 60 of relay 48. The lead wire 65 connects contact 58 and armature 40.

The fixed contact 44 of relay 38 is connected with the A.C. input terminal 24 by a lead wire 74. The relay coil 46 of relay 38 is connected between lead wire 76 and ground and it is seen that relay coil 52 is also connected between lead wire 76 and ground.

The lead wire 76 is connected to one terminal 78 of an electric switch 80. The electric switch includes a movable contactor 82 connected with junction 84. The junction 84 is connected with junction 34 by lead wire 86. The movable contactor 82 is operated by the throttle linkage 88 for the engine 18. The throttle linkage 88 in this case is shown connected with a hand lever 90 and this lever 90 operates the throttle 92 for the engine 18.

The engine 18 may be an engine for propelling a land vehicle or may be an engine for driving an aircraft or a boat. In connection with boat operation, the engine 18 may be, for example, an outboard motor. The throttle linkage 88 is so designed that the switch contactor 82 is maintained out of engagement with the fixed contact 78 at engine idle and at low speeds of the engine. When the throttle 92 is opened sufficiently by the throttle lever 90 to provide for a high speed condition of the engine, the contactor 82 is shifted into engagement with the fixed contact 78.

The junction 84 is connected with a lead wire 94 which is in turn connected with an ignition switch 96. The opposite side of ignition switch 96 is connected with lead wire 98 and this lead wire is connected with a junction 100 of a combined transistor voltage regulator and field relay 102. The transistor regulator and field relay 102 has a battery terminal 104, a first field terminal 106 and a second field terminal 108. Battery terminal 104 is connected with lead wire 110 which is in turn connected with junction 112. The field terminal 106 is connected with lead wire 114 and this lead wire is connected to one side of the alternating current generator field winding 16. A lead wire 116 connects an opposite side of the field winding 16 with the other field terminal 108.

The battery terminal 104 is connected to the fixed contact 118 of a field relay which includes this contact, a contact 120 carried by a movable armature and an actuating coil 122. The actuating coil 122 causes the contacts 118 and 120 to be engaged when it is energized. The actuating coil 122 is connected between junctions 100 and 124, the junction 124 being grounded, as shown. A resistor 126 is connected across the actuating coil 122.

The field terminal 106 is connected with a junction 128 and this junction is connected with the emitter electrode of a transistor 130. The transistor 130 has a collector electrode connected with lead wire 132 and has a base electrode connected with lead wire 134.

The lead wires 132 and 134 are at times connected by relay contacts 136 which are opened and closed in a rapid manner by a main actuating coil 138 and an accelerating coil 140. The relay coils 138 and 140 together with the contacts 136 form a vibratory type of voltage regulator wherein the contacts 136 are opened and closed in a rapid manner as is well known to those skilled in the art.

The main actuating coil 138 is connected between junctions 142 and 144. The junction 142 is connected with junctions 124 and 146 by the common lead wire 132. The accelerating winding 140 is connected between junction 148 and a resistor 150. The opposite side of this resistor is connected with lead wire 134 as is clearly apparent from the drawing.

The emitter and base electrodes of transistor 130 are connected by a resistor 151. A diode 152 connects junctions 128 and 156 and another diode 154 is connected between junction 156 and ground.

Figure 2:
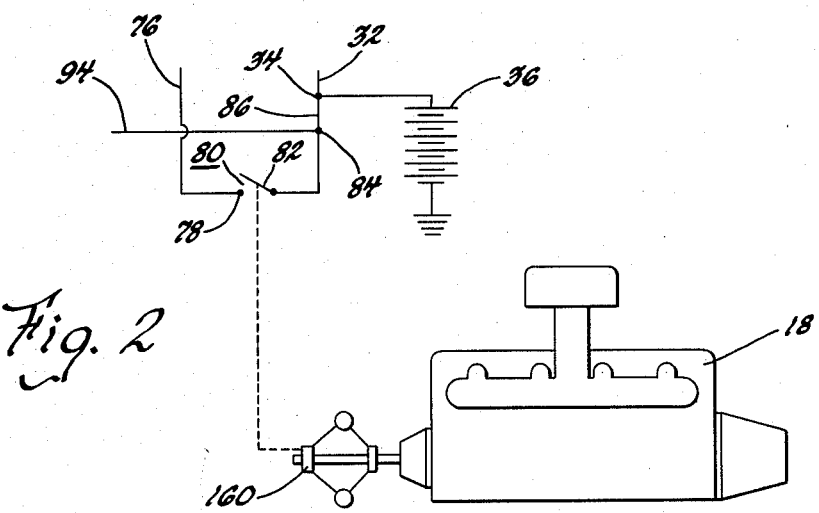
FIGURE 2 is a schematic circuit illustration of a portion of FIGURE 1 and illustrating a modified arrangement for actuating one of the switches illustrated in FIGURE 1.

Referring now to FIGURE 2, a modified arrangement for operating the switch 80 is illustrated. In FIGURE 2, the engine 18 drives a centrifugal device 160 which will cause a closure of switch 80 when the engine reaches a predetermined speed. At engine speeds below this predetermined speed, the switch 80 remains in an open position.

Figure 3:
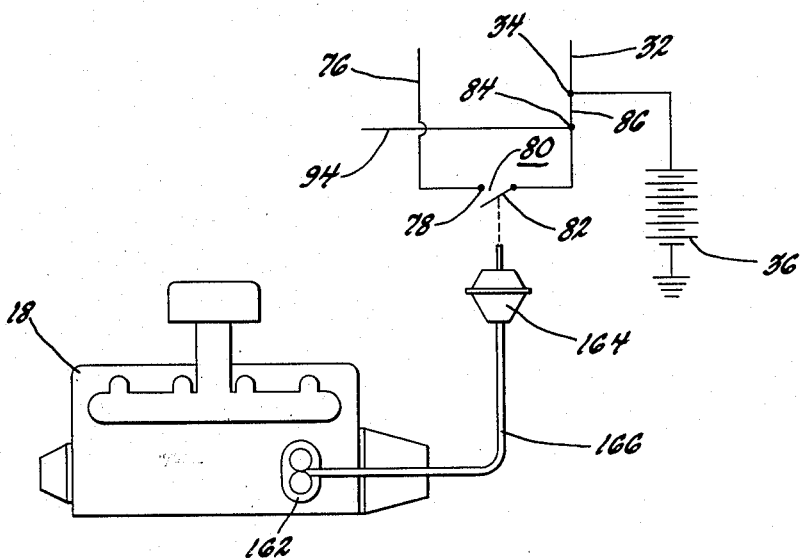
FIGURE 3 is a view similar to FIGURE 2 but illustrating still another modified arrangement for actuating one of the switches shown in FIGURE 1.

In FIGURE 3, still another modified arrangement is illustrated for actuing the switch 80. In this arrangement, the engine 18 drives an oil pump 162 which is connected with a fluid pressure actuator 164 of any conventional design through the pipe 166. In this arrangement, the switch 80 remains in an open position until the oil pump developes a sufficient pressure to cause the switch 80 to close.

In operation of the system that has just been described, the output windings 12 and 14 are connected in series or in parallel with the input terminals 24 and 26 of the bridge rectifier 22 in accordance with different operating conditions of the engine 18. The output voltage from D.C. terminals 28 and 30 remains substantially constant however due to the provision of the voltage regulating means 102 and this condition prevails whether the output windings 12 and 14 are connected in series or in parallel.

Assuming now that the switch 80 is in an open position, the relay coils 46 and 52 are both deenergized and the contacts of relays 38 and 48 will be in the positions illustrated in FIGURE 1. It can be seen that with the contacts of the relays in the position shown in FIGURE 1, the A.C. input terminals 24 and 26 are connected with the output windings 12 and 14 and these output windings are connected in series. This circuit may be traced from terminal 26 of bridge rectifier 22, through lead wire 68, through output winding 14, through lead wire 66, through closed contacts 56 and 58, through lead wire 64, through output winding 12, through lead wire 62, through fixed contact 44 and then through lead wire 74 to the A.C. input terminal 24 of bridge rectifier 22.

If it is assumed now that the switch 80 has been closed by changing operating conditions of the engine 18, it is seen that the output windings 12 and 14 are now connected in parallel with each other and across the A.C. input terminals 24 and 26 of bridge rectifier 22. The relay coils 46 and 52 will have both been energized to cause a closure of contacts 42 and 44 and a closure of contacts 54 and 60. The parallel connection for the output windings 12 and 14 may now be traced from A.C. input terminal 26, lead wire 68, lead wire 72, closed contacts 54 and 60, lead wire 64, output winding 12, lead wire 62, closed contacts 42 and 44, and lead wire 74 to A.C. input terminal 24. The circuit can be traced further from closed contacts 42 and 44 through lead wire 65, contact 58, lead wire 66, output winding 14, and lead wire 68 to the A.C. input terminal 26. The shifting of the contactor 82 to a closed position will, of course, occur in accordance with a condition of operation of engine 18, as is seen from FIGURES 1 through 3.

The output voltage coming from the D.C. output terminals 28 and 30 of bridge rectifier 22 is maintained substantially constant regardless of whether the output windings 12 and 14 are connected in series or in parallel. This constant voltage is maintained by the transistor voltage regulator 102 which controls field current through the field winding 16. The circuit for energization of the field winding 16 from the D.C. output terminals 28 and 30 or from the battery 36 can be traced from junction 34, through lead wire 86, junction 84, through lead wire 94, junction 112, through lead wire 110, through contacts 118 and 120, through junction 144 and terminal 108, through lead wire 116, through field winding 16, through lead wire 114, through terminal 106, through junction 128, through the emitter-collector circuit of transistor 130, through lead wire 132 and then through junctions 142 and 124 to ground. Contacts 118 and 120 of the field relay are closed at this time providing that the ignition switch 96 has been closed to provide an energization path for the field relay actuating coil 122. The amount of current flowing through the generator field winding 16 will depend upon the conductance of the transistor 130 between its emitter and collector electrodes. The transistor 130 is operated either at a substantially fully conductive state or a substantially fully nonconductive state. The conductivity of transistor 130 depends upon the opening and closing of contacts 136. When contacts 136 are closed, there is a base circuit for transistor 130 and the transistor is then substantially fully conductive. On the other hand, when contacts 136 are open the base circuit for the transistor is interrupted and the emitter to collector current of transistor 130 is interrupted.

The turning on and turning off of the transistor 130 is a function of the output voltage appearing between junction 34 and ground and this voltage is the voltage of the output terminals of bridge rectifier 22. This voltage appearing between output terminals 28 and 30 is sensed by the main relay coil winding 138 that operates the contacts 136. This circuit for the main actuating relay coil 138 may be traced from junction 34, through junction 84, through lead wire 94, junction 112, through lead wire 110, through closed contacts 118 and 120, through junction 144, through the relay actuating coil 138 to junction 142, and through junction 124 to ground. The circuit for the accelerating coil 140 that operates the relay contacts 136 in conjunction with the main relay coil 138 is through resistor 150 and then through contracts 136 when they are closed. Since the voltage regulator 102 senses the voltage across the terminals 28 and 30, it will maintain this voltage substantially constant regardless of whether the output windings 12 and 14 are effectively conected in series or in parallel. It, of course, will be appreciated that when the output windings 12 and 14 are connected in series, their voltages are additive since they are in phase and the regulator must therefore cut back the field current in field winding 16 to maintain a constant output voltage across the output terminals 28 and 30 of bridge rectifier 22.

With the system that has been described, sufficient output is maintained at idling conditions of engine 18 by virtue of the fact that output windings at this time are connected in series. When the engine is operating at high speed, the output windings 12 and 14 are then connected in parallel due to the closure of the switch contactor 82. The voltage regulating means will maintain a substantially constant voltage from terminals 28 and 30. It is seen that the system of this invention provides direct current voltage for charging the battery of a motor vehicle electrical system and for supplying other loads on the motor vehicle during widely varying speed conditions and load conditions of the engine 18.

While the embodiments of the present invention as herein disclosed constitute preferred forms, it is to be understood that other forms might be adopted.

What is claimed is as follows:

1. An electric power system for a motor vehicle comprising, a variable speed engine, an alternating current generator driven by said engine having first and second output windings and a field winding, said first and second output windings producing voltages which are in phase, a bridge rectifier network having a pair of A.C. input terminals and a pair of D.C. output terminals, a battery connected directly across the D.C. output terminals of said bridge rectifier network, voltage regulating means connected with the D.C. output terminals of said bridge rectifier network and with said field winding for controlling the current flow through said field winding as a function of the output voltage appearing across the D.C. output terminals of said bridge rectifier network, said voltage regulating means including a transistor which has its emitter-collector circuit connected in series with said field winding, a first relay means including a first actuating coil, a first movable contact and a first fixed contact, a second relay means including a second actuating coil, a second movable contact and third and fourth fixed contacts, means connecting a first side of said first output winding with one of the A.C. input terminals of said bridge rectifier network and with the fixed contact of said first relay means, means connecting a second side of said second output winding with the other A.C. input terminal of said bridge rectifier network and with the third fixed contact of said second relay means, means connecting the first side of said second output winding with the movable contact of said first relay means and with the fourth fixed contact of said second relay means, means connecting the second side of said first output winding with the movable contact of said second relay means, and switch means connected with said battery and with one of the D.C. output terminals of said bridge rectifier operable to simultaneously energize both of the actuating coils of said first and second relays when it is closed whereby said relay contacts connect said output windings in parallel.

2. An electric power system for a motor vehicle comprising, a variable speed engine, an alternating current generator driven by said engine including first and second output windings and a field winding, a bridge rectifier network having a pair of A.C. input terminals and a pair of D.C. output terminals, voltage regulating means sensing the output voltage appearing across said D. C. output terminals of said bridge rectifier network and controlling the current flow through said field winding as a function of the output voltage appearing across the D.C. terminals of said bridge rectifier network, first relay means including a first actuating coil, a first fixed contact and a first movable contact, second relay means including a second actuating coil, a second movable contact, and third and fourth fixed contacts, means connecting a first side of said first output winding directly with one of the A.C. input terminals of said bridge rectifier network and with said first fixed contact of said first relay means, means connecting the second side of said first output winding with said second movable contact of said second relay means, means connecting a first side of said second output winding with the fourth fixed contact of said second relay means and with the first movable contact of said first relay means, means connecting the second side of said second output winding with the other A.C. input terminal of said bridge rectifier network and with the third fixed contact of said second relay means, and switch means connected with said battery and with one of the D.C. output terminals of said bridge rectifier for controlling the energization of said first and second actuating coils, said first and second relay means being operable to connect said output windings in parallel when said first and second actuating coils are energized.

3. An electric power system for a motor vehicle comprising, a variable speed engine, an alternating current generator driven by said engine having first and second output windings and a field winding, a bridge rectifier network having a pair of A.C. input terminals and a pair of D.C. output terminals, a battery connected directly across the D.C. output terminals of said bridge rectifier network, voltage regulating means connected with the D.C. output terminals of said bridge rectifier network and with said field winding for controlling the current flow through said field winding as a function of the output voltage appearing across the D.C. terminals of said bridge rectifier network, means directly connecting a first side of said first output winding with one of the A.C. input terminals of said bridge rectifier network, means connecting a second side of said second output winding directly with the other A.C. input terminal of said bridge rectifier network, and switch means, said switch means in one position connecting the second side of said first output winding with the first side of said second output winding, said switch means in another position connecting the second side of said first output winding with the second side of said second output winding and connecting the first side of said second output winding with the first side of said first output winding.

References Cited in the file of this patent

UNITED STATES PATENTS

| | | |
|---|---|---|
| 2,476,373 | Hobart | July 19, 1949 |
| 2,506,809 | Nims | May 9, 1950 |
| 2,992,383 | Hetzler et al. | July 11, 1961 |
| 3,017,563 | Renner et al. | Jan. 16, 1962 |

FOREIGN PATENTS

| | | |
|---|---|---|
| 759,885 | Great Britain | Oct. 24, 1956 |